United States Patent [19]
Li et al.

[11] Patent Number: 5,963,603
[45] Date of Patent: Oct. 5, 1999

[54] TIMING RECOVERY AND FRAME SYNCHRONIZATION IN COMMUNICATIONS SYSTEMS

[75] Inventors: Yong Li, Kanata; Rui Wang, Ottawa, both of Canada; Iouri Trofimov, Moskva, Russian Federation; Alexandre Chloma; Mikhail Bakouline, both of Moskovskaja oblast, Russian Federation; Vitali Kreindeline, Moskva, Russian Federation

[73] Assignee: Nortel Networks Corporation, Montreal, Canada

[21] Appl. No.: 08/688,911

[22] Filed: Jul. 31, 1996

Related U.S. Application Data

[60] Provisional application No. 60/002,708, Aug. 23, 1995, and provisional application No. 60/005,819, Oct. 23, 1995.

[51] Int. Cl.$^6$ .............................. H04L 7/00; H03D 1/00
[52] U.S. Cl. ........................................... 375/355; 375/341
[58] Field of Search .................... 375/355, 354, 375/341; 371/43.6, 43.5

[56] References Cited

U.S. PATENT DOCUMENTS

| | | | |
|---|---|---|---|
| 4,596,024 | 6/1986 | Thomson | 375/347 |
| 4,692,931 | 9/1987 | Ohsawa | 375/355 |
| 4,768,208 | 8/1988 | Cornett | 375/355 |
| 4,866,739 | 9/1989 | Agazzi et al. | 375/355 |
| 4,881,059 | 11/1989 | Saltzbert et al. | 375/355 |
| 4,918,709 | 4/1990 | Fitch | 375/328 |
| 5,001,724 | 3/1991 | Birgenheier et al. | 375/226 |
| 5,170,415 | 12/1992 | Yoshida et al. | 375/355 |
| 5,187,719 | 2/1993 | Birgenheier et al. | 375/226 |
| 5,204,878 | 4/1993 | Larsson | 375/232 |
| 5,255,290 | 10/1993 | Anvari | 375/344 |
| 5,442,661 | 8/1995 | Falconer | 370/479 |
| 5,444,721 | 8/1995 | Okanoue et al. | 375/341 |
| 5,495,203 | 2/1996 | Harp et al. | 329/306 |
| 5,648,991 | 7/1997 | Namekata et al. | 375/231 |
| 5,703,908 | 12/1997 | Mammone et al. | 375/278 |
| 5,706,314 | 1/1998 | Davis et al. | 375/355 |
| 5,793,821 | 8/1998 | Norrel et al. | 375/355 |

*Primary Examiner*—Chi H. Pham
*Assistant Examiner*—Khai Tran
*Attorney, Agent, or Firm*—Foley & Lardner

[57] ABSTRACT

Timing recovery, with or without frame synchronization, in a cellular TDMA communications system is carried out by a method comprising estimating indirect variables, which embody sampling delay information, of a linear complex vector using a maximum likelihood criterion, and recovering the sampling delay from the estimated indirect variables. For recovering the sampling delay, an optimal procedure and three sub-optimal, but computationally simpler, procedures are described, along with their physical implementations. For frame synchronization, the timing recovery sampling delay is supplemented by a number of sample spacings determined by a maximum of signal amplitudes of a plurality of samples, calculated from the estimated indirect variables and the timing recovery sampling delay.

27 Claims, 3 Drawing Sheets

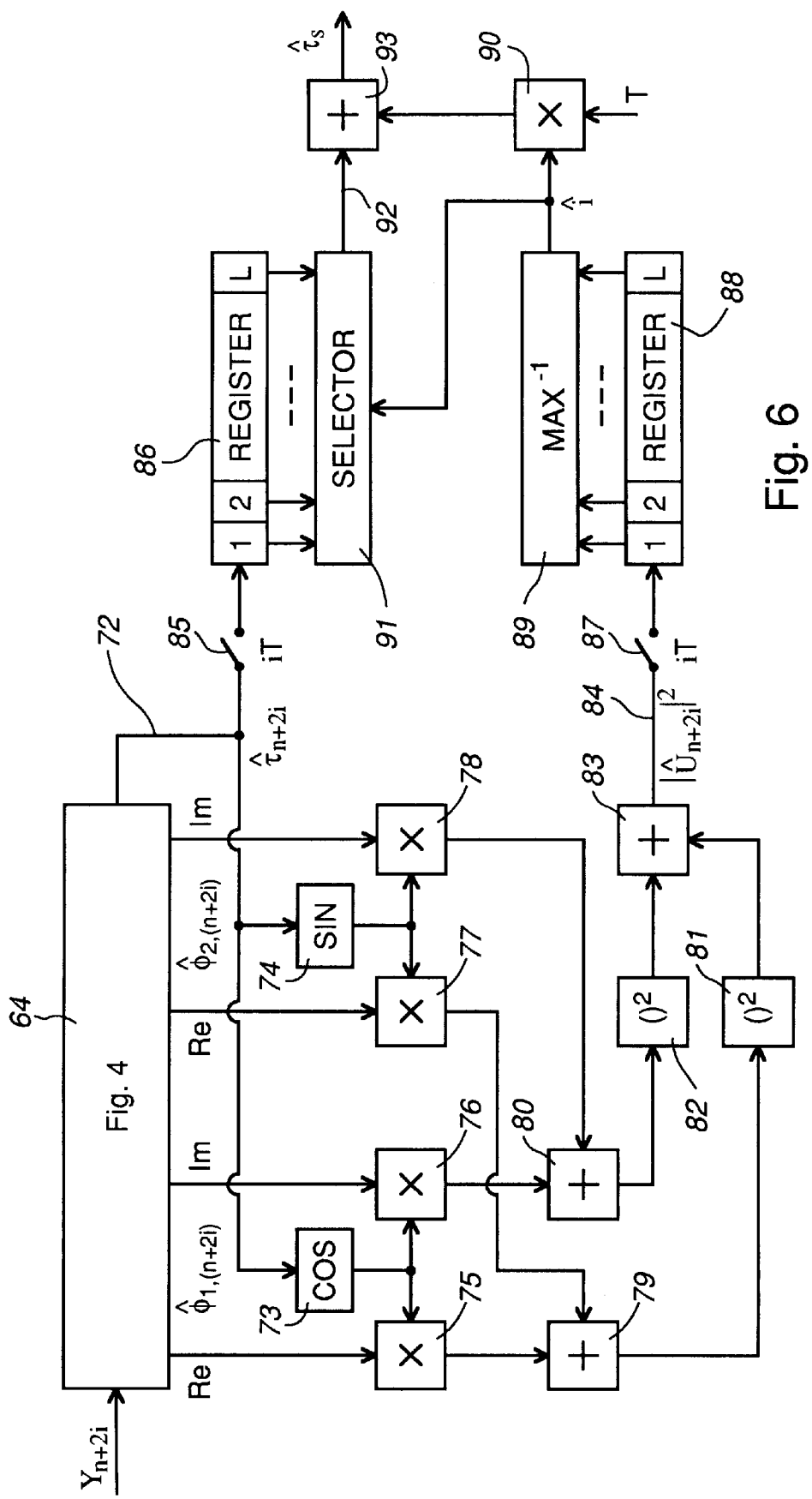

TIMING RECOVERY AND FRAME SYNCHRONIZATION IN COMMUNICATIONS SYSTEMS

This application claims the benefit of U.S. Provisional Applications No. 60/002,708 filed Aug. 23, 1995 and No. 60/005,819 filed Oct. 23, 1995.

BACKGROUND OF THE INVENTION

This invention relates to timing recovery and frame synchronization in communications systems. The invention is applicable to any communications system having known sync (synchronization) sequences or words, and is especially applicable to, and is described below in the context of, a TDMA (time division multiple access) cellular communications system compatible with EIA/TIA document IS-54-B: Cellular System Dual-Mode Mobile Station—Base Station Compatibility Standard (Rev. B). For convenience and brevity, such a system is referred to below simply as an IS-54 system. In such a system, data is communicated in time slots each comprising a sync word of 14 symbols followed by an information sequence.

It is well known that it is necessary in communications systems to recover the timing and synchronize to the time division multiplex (TDM) frames of a received digital data communications signal, so that samples of the signal are obtained at optimum times for further processing to recover the communicated data. It is also well known that timing recovery, frame synchronization, and the necessary processing of the samples are made more difficult by a low signal-to-noise ratio (SNR), and that a low SNR can often be present in cellular communications systems.

Denoting the symbol spacing of the received signal, and hence the period between successive samples, as T, and denoting the sampling delay, i.e. the period between the optimal and actual sampling times of the received signal, as $\tau$, then frame synchronization serves to ensure that the sampling delay $\tau$ is within one symbol spacing, i.e. $\tau$ is within the interval from $-T/2$ to $T/2$, and timing recovery serves to reduce the sampling delay $\tau$ to substantially zero. In practice, a sampling delay control signal can be used to adjust the actual sampling times or, equivalently, to control an interpolator to which the actual samples are supplied to obtain interpolated samples at the optimal sampling times, whereby frame synchronization and timing recovery is achieved.

An object of this invention is to provide improved frame synchronization and timing recovery in a communications system.

SUMMARY OF THE INVENTION

According to one aspect, this invention provides a method of determining sampling delay in samples of a received communications signal, comprising the steps of: estimating, using a maximum likelihood criterion, indirect variables of a linear complex vector which approximates the received signal samples, the indirect variables embodying sampling delay information; and determining a sampling delay from the estimated indirect variables for timing recovery of the received communications signal.

Preferably each component of the linear complex vector comprises a linear combination of a predetermined pair of functions dependent upon the sampling delay, and the pair of functions conveniently comprise the functions $\cos(\pi\tau)$ and $\sin(\pi\tau)$ where $\tau$ represents the sampling delay. Each indirect variable is conveniently estimated by filtering the received signal samples using a finite impulse response filter characteristic.

The sampling delay can be determined from the estimated indirect variables in at least the following possible ways involving a trade-off between accuracy and computational complexity:

(i) by multiplying the estimated indirect variables by real elements of predetermined stored matrices;

(ii) by performing a single non-linear transformation of the estimated indirect variables:

(iii) by calculation in accordance with a function $(1/\pi)$atan of the real part of a product of the complex conjugate of a first estimated indirect variable with a second estimated indirect variable, divided by the square of the amplitude of the first estimated indirect variable;

(iv) by a sequence of steps comprising initially calculating an estimate of the sampling delay in accordance with a predetermined function of the estimated indirect variables, and iteratively one or more times: estimating a complex fading factor of the received signal samples in dependence upon the estimate of the sampling delay and the estimated indirect variables; and re-estimating the sampling delay in dependence upon the estimated complex fading factor and the estimated indirect variables.

In order to provide for frame synchronization as well as timing recovery, the method can further comprise the steps of: adding to the determined sampling delay for timing recovery of the received communications signal a sampling delay comprising an integer number i of sampling spacings T for frame synchronization of the received communications signal; and determining the number i by the steps of: determining, in dependence upon the estimated indirect variables and the determined sampling delay for timing recovery, signal amplitudes of a plurality of received signal samples; and selecting the number i corresponding to a maximum amplitude sample. The step of determining signal amplitudes can comprise iteratively determining the signal amplitudes in dependence upon iterative determinations of the sampling delay for timing recovery.

Another aspect of the invention provides a method of frame synchronization and timing recovery by determining sampling delay in samples of a received communications signal, comprising the steps of: estimating, using a maximum likelihood criterion, indirect variables of a linear complex vector which approximates the received signal samples, the indirect variables embodying sampling delay information; and for each of a plurality of received signal samples: determining a first sampling delay from the estimated indirect variables, the first sampling delay being less than the sample spacing; determining, in dependence upon the estimated indirect variables and the respective first sampling delay, the signal amplitude of each of a plurality of received signal samples; identifying an index of a maximum of the determined signal amplitudes relative to a current sample; and adding the first sampling delay for the sample identified by the index to a product of the sampling spacing multiplied by the index to produce a combined sampling delay for frame synchronization and timing recovery.

The steps of determining the first sampling delay and the signal amplitudes can be performed iteratively.

The invention also provides apparatus for determining a sampling delay for sampling a received communications signal, comprising: a plurality of finite impulse response filters responsive to received signal samples for producing a plurality of indirect variables of a linear complex vector which approximates the received signal samples according to a maximum likelihood criterion; and a calculation unit responsive to the plurality of indirect variables for calculating an estimated sampling delay. The plurality of finite impulse response filters and the calculating unit are conveniently constituted by functions of at least one digital signal processor.

BRIEF DESCRIPTION OF THE DRAWINGS

The invention will be further understood from the following description with reference to the accompanying drawings, in which:

FIG. 6 schematically illustrates a frame synchronization and timing recovery arrangement in accordance with a further embodiment of the invention.

DETAILED DESCRIPTION

Figure 1:
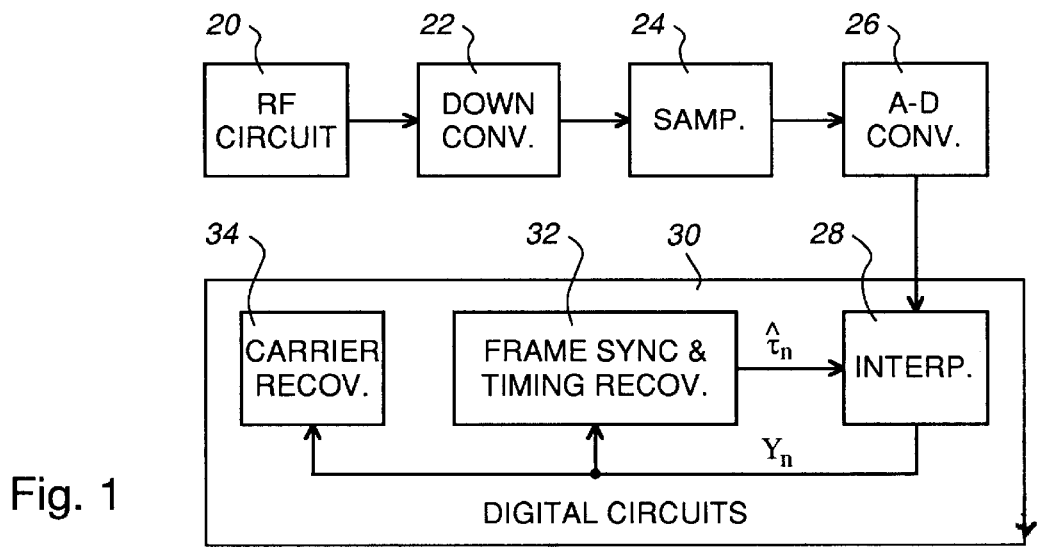
FIG. 1 schematically illustrates a block diagram of parts of a wireless digital communications receiver.

The following description initially presents, by way of example, signal and observation models for an IS-54 system, followed by a description of procedures which can be used in accordance with the method of the invention. Physical implementations of timing recovery arrangements and a frame synchronization and timing recovery arrangement in accordance with the invention are then described in detail with reference to the drawings. Although the detailed description relates specifically to IS-54 systems, it is emphasized that this is by way of example and that the invention is applicable to other communications systems with known synchronization sequences.

Signal and Observation Models

An IS-54 system uses $\pi/4$-shifted DQPSK (differential quadrature phase shift keyed) signal symbols which can be described by the equations:

$$s_k = s_{k-1} w_k, \quad w_k = (\theta_k + j v_k)/\sqrt{2}, \quad k=1, 2, 3, \quad (1)$$

where k is a positive integer identifying the symbol $s_k$, $w_k$ is a complex value, representing binary information, with real and imaginary parts $\theta_k$ and $v_k$ respectively, $\theta_k$, $v_k \in \{-1,1\}$ (i.e. each of $\theta_k$ and $v_k$ is one of the set of values $-1$ and $1$, i.e. is either $-1$ or $1$); and $|s_k|=1$ for any k (i.e. the amplitude of $s_k$ is 1). The 14 complex values which make up an IS-54 system sync word are the set $\{w_1, w_2, \ldots w_M\}$ with M=14, and $\{s_0, s_1, s_2, \ldots s_M\}$ represents the set of signal symbols in a sync word, with $s_0=1$.

With sampling as is usual at twice the symbol rate, a discrete observation model of the received signal samples has the form:

$$y_i = U_i \left( \sum_{k=0}^{M} s_k \cdot g(iT/2 - \tau - kT - T/2) \right) + \eta_i \quad (2)$$

where $y_i$ is a complex sample identified by the index i which is an integer from 1 to 2M+1, T is the symbol spacing, $\tau$ is the sampling delay, $U_i$ is an unknown complex fading factor, g(t) is the impulse response of the channel filters (the transmit and receive filters combined) given by:

$$g(t) = \left( \frac{\sin(\pi t/T)}{\pi t/T} \right) \left( \frac{\cos(\alpha \pi t/T)}{(1-(2\alpha t/T)^2)} \right)$$

where $\alpha$ is the filter roll-off coefficient, and $\eta_i$ is the sequence of complex Gaussian random variables with zero mean, variance $2\sigma_\eta$, and correlation function $2\sigma_\eta g(((i-j)T)/2)$ between two random variables $\eta_i$ and $\eta_j$.

Timing Recovery Method

The observation model given by equation (2) is approximated by a linear vector observation model containing indirect variables which embody information as to the sampling delay $\tau$. These indirect variables are estimated according to the maximum-likelihood criterion. The sampling delay is then recovered from the estimated indirect variables.

Linear Vector Observation Model

With $[ \ ]^T$ representing the conjugate transpose of the matrix within the square brackets, let the (2M+1)-dimensional observation vector of the samples of the received signal be:

$$Y_n = [y_{2n+1}, y_{2n+2}, \ldots y_{2n+2M}, y_{2n+2M+1}]^T, \quad (3)$$

the (M+1)-dimensional vector of the known symbols of the sync word be:

$$S = [s_0, s_1, \ldots s_{M-1}, s_M]^T, \quad (4)$$

and the (2M+1)-dimensional observation vector of noise samples be:

$$H_n = [\eta_{2n+1}, \eta_{2n+2}, \ldots \eta_{2n+2M}, \eta_{2n+2M+1}]^T, \quad (5)$$

Denoting the impulse response matrix by:

$$G(\tau) = \begin{vmatrix} g(-\tau) & g(-\tau - T) & \cdots & g(-\tau - MT) \\ g(-\tau + T/2) & g(-\tau - T/2) & \cdots & g(-\tau - MT + T/2) \\ g(-\tau + T) & g(-\tau) & \cdots & g(-\tau - (M-1)T) \\ \cdots & \cdots & \cdots & \cdots \\ g(-\tau + MT) & g(-\tau + (M-1)T) & \cdots & g(-\tau) \end{vmatrix}, \quad (6)$$

the model of equation (2) can then be written in the vector form:

$$Y_n = G(\tau) S U_n + H_n \quad (7)$$

In order to linearize this model, each component $g_{ij}(\tau)$ of the matrix $G(\tau)$ is approximated by a linear combination, plus a constant term, of some function pair $\phi_1(\tau)$ and $\phi_2(\tau)$, so that $$g_{ij}(\tau) \approx a_{1ij} \phi_1(\tau) + a_{2ij} \phi_2(\tau) + a_{3ij}$$

where $a_{1ij}$, $a_{2ij}$, and $a_{3ij}$ are matrix coefficients for matrices $A_1$, $A_2$, and $A_3$ respectively. Then it is possible to make the following approximation for the matrix $G(\tau)$:

$$G(\tau) = A_1 \phi_1(\tau) + A_2 \phi_2(\tau) + A_3 \quad (8)$$

in the interval from $-T/2$ to $T/2$ for the sampling delay $\tau$.

A number of function pairs, for example represented by the following pairs of equations (9) to (13), can be used for this linearization and provide sufficient approximation accuracy. In the pair of equations (11), $\tilde{g}(\tau)$ represents the Hilbert transform of the function $g(\tau)$:

$$\varphi_1(\tau) = \cos(\pi\tau) \qquad (9)$$
$$\varphi_2(\tau) = \sin(\pi\tau)$$

$$\varphi_1(\tau) = \cos(\pi\tau/2) \qquad (10)$$
$$\varphi_2(\tau) = \sin(\pi\tau/2)$$

$$\varphi_1(\tau) = g(\tau) \qquad (11)$$
$$\varphi_2(\tau) = \tilde{g}(\tau)$$

$$\varphi_1(\tau) = g(\tau) \qquad (12)$$
$$\varphi_2(\tau) = d\,g(\tau)/d\tau$$

$$\varphi_1(\tau) = (g(\tau + T/4) + g(\tau - T/4))/2 \qquad (13)$$
$$\varphi_2(\tau) = (g(\tau + T/4) - g(\tau - T/4))/2$$

While any of these or other possible function pairs can be used, the first function pair (9) provides good accuracy and the least computational complexity and is preferred for these reasons. Only this function pair is considered in further detail below.

Using the approximation in equation (8), the observation model of equation (7) becomes $$Y_n = (A_1\phi_1(\tau) + A_2\phi_2(\tau) + A_3)SU_n + H_n \qquad (14)$$

or equivalently:

$$Y_n = A_1 S U_n \phi_1 + A_2 S U_n \phi_2 + A_3 S U_n + H_n \qquad (15)$$

If $\Phi_n$ is a variable which is a 3-dimensional complex vector constituted by the transpose of three indirect variables $\phi_{1,n}$, $\phi_{2,n}$, and $\phi_{3,n}$, i.e. $\Phi_n = [\phi_{1,n}, \phi_{2,n}, \phi_{3,n}]^T$, with $\phi_{1,n} = U_n\phi_1$, $\phi_{2,n} = U_n\phi_2$, and $\phi_{3,n} = U_n$, and with B being a known constant matrix $B = [A_1 S, A_2 S, A_3 S]$, then equation (15) can be written as:

$$Y_n = B\Phi_n + H_n \qquad (16)$$

Estimation of Indirect Variables

If $V_\eta$ is the known correlation matrix of the additive Gaussian noise vector $H_n$, then from equation (16) it can be seen that the likelihood function for estimating the indirect variable vector $\Phi_n$ is given by the conditional probability $p(Y_n|\Phi_n)$ (i.e. the probability of $Y_n$ given the condition $\Phi_n$):

$$p(Y_n | \Phi_n) = \frac{\exp(-((Y_n - B\Phi_n)'V_\eta^{-1}(Y_n - B\Phi_n))/2)}{(2\pi)^{M+1/2}det(V_\eta)^{1/2}} \qquad (17)$$

The suffix ' indicates the conjugate transpose. Representing estimated values by a circumflex ^, the maximum likelihood estimate $\hat{\Phi}_n$ for the indirect variable vector $\Phi_n$ can be determined to be:

$$\hat{\Phi}_n = CY_n \qquad (18)$$

where $C = (B'V_\eta^{-1}B)^{-1}B'V_\eta^{-1}$ is a $3\times(2M+1)$ matrix that can be calculated from B and $V_{72}$ (both of which are known) and stored in a look-up table in memory.

The next step is to recover the sampling delay $\tau$ from the estimate $\hat{\Phi}_n$.

Recovery of Sampling Delay

Any of several procedures can be used to recover the sampling delay, the choice depending on the trade-off between estimation accuracy and computational complexity. The following describes an optimal estimation and three sub-optimal, but computationally simpler, estimations.

Optimal Estimation

From equation (17), a new observation equation for indirect variables can be derived:

$$\hat{\Phi}_n = \Phi_n + \Gamma_n \qquad (19)$$

where $\Gamma_n$ is a 3-dimensional vector of complex Gaussian random variables with known correlation matrix $V_\gamma = (B'V_\eta^{-1})$. Equation (19) can be written in the form:

$$\hat{\Phi}_n = F(\tau)U_n + \gamma_n \qquad (20)$$

where $F(\tau) = [\phi_1(\tau), \phi_2(\tau), 1]^T$. The observation noise in equation (20) is Gaussian, so that the likelihood function of the observation can be obtained as:

$$p(\hat{\Phi}_n | U_n, \tau) = \frac{\exp(-((\hat{\Phi}_n - F(\tau)U_n)'V_\gamma^{-1}(\hat{\Phi}_n - F(\tau)U_n))/2)}{(2\pi)^{3/2}det(V_\gamma)^{1/2}} \qquad (21)$$

and averaged over the complex variable $U_n$ to determine the following equation for the likelihood function with respect to $\tau$:

$$p(\hat{\Phi}_n | \tau) = \frac{\exp(-(\hat{\Phi}'_n V_\gamma^{-1}F(\tau)(F(\tau)'V_\gamma^{-1}F(\tau))^{-1}F(\tau)'V_\gamma^{-1}\hat{\Phi}_n)/2)}{(2\pi)det(V_\gamma)^{1/2}det(F(\tau)'V_\gamma^{-1}F(\tau))D(\hat{\Phi}_n)} \qquad (22)$$

where $D(\hat{\Phi}_n) = \exp\left(\frac{1}{2}\hat{\Phi}'_n V_\gamma^{-1}\hat{\Phi}_n\right)$.

According to the maximum likelihood criterion, an optimal estimate of the sampling delay $\tau$ should maximize this likelihood function. Consequently, it can be determined that the optimal estimate $\hat{\tau}_n$ of the sampling delay within the time interval from $-T/2$ to $T/2$ is:

$$\hat{\tau}_n = \max\,(\hat{\Phi}'_n V_\gamma^{-1}F(\tau)(F(\tau)'V_\gamma^{-1}F(\tau))^{-1}F(\tau)'V_\gamma^{-1}\hat{\Phi}_n) \qquad (23)$$

Making the following approximation:

$$\hat{\Phi}'_n V_\gamma^{-1}F(\tau)(F(\tau)'V_\gamma^{-1}F(\tau))^{-1}F(\tau)'V_\gamma^{-1}\hat{\Phi}_n \approx$$
$$\hat{\Phi}'_n(Q_1(\phi_1^2(\tau)-\phi_2^2(\tau))+Q_2\phi_1(\tau)\phi_2(\tau)+Q_3\phi_1(\tau)+Q_4\phi_2(\tau)+Q_5)\,\hat{\Phi}_n \qquad (24)$$

where Q1 to Q5 are $3\times3$ expansion matrices having real elements that can be calculated and stored in a look-up table in memory, then using the function pair (9) the optimal sampling delay $\hat{\tau}_n$ can be computed as:

$$\hat{\tau}_n = \max^{-1}(q_{1,n}\cos(2\pi\tau) + q_{2,n}\sin(2\pi\tau) + q_{3,n}\cos(\pi\tau) + q_{4,n}\sin(\pi\tau) + q_{5,n}) \qquad (25)$$

where $q_{i,n} = \hat{\Phi}'_n Q_i \hat{\Phi}_n$ for i=1, 3, 4, and 5 and $q_{2,n} = \hat{\Phi}'_n Q_2 \hat{\Phi}_n/2$.

Equation (25) comprises a non-linear maximization, for which reason its implementation in practice may be computationally complex. The following three sub-optimal alternative procedures avoid this disadvantage and can be easily implemented.

One-Step Non-Linear Transformation

The estimations of the three indirect variables can be expressed in the form $\hat{\phi}_{i,n} = U_n\phi_i(\tau) + \Delta\phi_{i,n}$ for i=1, 2, and 3, where $\Delta\phi_{i,n}$ is the estimation error induced by equation (18). If the estimation error is small, then the estimated sampling delay $\hat{\tau}_n$ can be approximated by a one-step non-linear transformation of the form:

$$\hat{\tau}_n = f\left(\frac{\text{real}(\hat{\phi}_{2,n}\hat{\phi}'_{3,n})}{\text{real}(\hat{\phi}_{1,n}\hat{\phi}'_{3,n})}\right) \qquad (26)$$

where the function f() depends upon the function pair $\phi_1$ and $\phi_2$. Using the function pair (9), equation (23) becomes:

$$\hat{\tau}_n = \frac{1}{\pi} a \tan\left(\frac{\text{real}(\hat{\phi}_{2,n}\hat{\phi}'_{3,n})}{\text{real}(\hat{\phi}_{1,n}\hat{\phi}'_{3,n})}\right) \quad (27)$$

An implementation of this first solution for the sampling delay is described below with reference to FIG. 3 and requires 6M+5 complex multiplications, 6M complex additions, 1 real division, and 1 non-linear scalar transformation.

Recursive Procedure

The following, alternative, recursive estimation procedure for the sampling delay is based on a maximization of the likelihood function with respect to variables $\phi_1$, $\phi_2$, and $U_n$, first considering the maximum likelihood estimation for the variables $\phi_1$ and $\phi_2$ with the assumption that $U_n$ is known, and then considering the estimation of $U_n$ with the assumption that the sampling delay $\tau$ is known.

First, the following likelihood function can be derived from equation (21):

$$p(\hat{\phi}_{1,n}, \hat{\phi}_{2,n} | \phi_1, \phi_2) \approx \quad (28)$$

$$\exp\left(-\frac{1}{2}\left(\left|\begin{matrix}\mu_{1,n}\\ \mu_{2,n}\end{matrix}\right| - \left|\begin{matrix}\phi_1\\ \phi_2\end{matrix}\right|\right) V_{\varphi,n}^{-1} \left(\left|\begin{matrix}\mu_{1,n}\\ \mu_{2,n}\end{matrix}\right| - \left|\begin{matrix}\phi_1\\ \phi_2\end{matrix}\right|\right)\right)$$

with $V_{\varphi,n} = \left(\frac{1}{|U_n|^2}\right)\left|\begin{matrix}V_{\gamma 11} - |V_{\gamma 13}|^2/V_{\gamma 33} & 0 \\ 0 & V_{\gamma 22}\end{matrix}\right|,$ $\mu_{1,n} = \hat{\phi}_{1,n} U_n^{-1} - c_\gamma(\hat{\phi}_{3,n} - U_n)U_n^{-1}$, and $\mu_{2,n} = \hat{\phi}_{2,n} U_n^{-1}$ where $V_{\gamma ij}$ are elements of the matrix $V_\gamma$ and $c_\gamma = V_{\gamma 13}/V_{\gamma 33}$. In the derivation it is assumed that $V_{\gamma 12} = V_{\gamma 21} = V_{\gamma 23} = V_{\gamma 32} = 0$.

From equation (28) it follows that $\hat{\phi}_{1,n} = \mu_{1,n}$ and $\hat{\phi}_{2,n} = \mu_{2,n}$, and estimated sampling delay is given by the following non-linear transformation:

$$\hat{\tau}_n = f\left(a \tan\left(\frac{\text{real}(\hat{\phi}_{2,n})}{\text{real}(\hat{\phi}_{1,n})}\right)\right) \quad (29)$$

Second, from equation (21) the likelihood function for $U_n$ assuming that the sampling delay $\tau$ is known can be derived as:

$$p(\hat{\phi}_{1,n}, \hat{\phi}_{2,n} | Un) \approx \exp\left(-\frac{1}{2}(W_n - U_n)'V_u^{-1}(W_n - U_n)\right) \quad (30)$$

where $V_u = (F(\tau)'V_\gamma^{-1}F(\tau))^{-1}$ and $W_n = (F(\tau)'V_\gamma^{-1}F(\tau))^{-1}F(\tau)$ $'V_\gamma^{-1}\hat{\Phi}_n$, from which it follows that the estimate $\hat{U}_n = W_n$.

The recursive procedure is then summarized as comprising the following four sequential steps for each iteration k:

Step 1: Initial estimation of the sampling delay in accordance with equation (31):

$$\hat{\tau}_n^{k=0} = f\left(a \tan\left(\text{real}\frac{(\hat{\phi}_{2,n})}{(\hat{\phi}_{1,n})}\right)\right) = f\left(a \tan\left(\frac{\text{real}(\hat{\phi}_{2,n}\hat{\phi}_{1,n}')}{|\hat{\phi}_{1,n}|^2}\right)\right) \quad (31)$$

Step 2: Estimation of the fading factor in accordance with equation (32):

$$\hat{U}_n^k = (F(\hat{\tau}_n^k)'V_\gamma^{-1}F(\hat{\tau}_n^k))^{-1}F(\hat{\tau}_n^k)'V_\gamma^{-1}\hat{\Phi}_n \quad (32)$$

Step 3: Re-estimation of the sampling delay in accordance with equation (33):

$$\hat{\tau}_n^{k+1} = f\left(a \tan\left(\text{real}\frac{(\hat{\phi}_{2,n})}{(\hat{\phi}_{1,n} - c_\gamma(\hat{\phi}_{3,n} - \hat{U}_n^k))}\right)\right) \quad (33)$$

Step 4: Stop if a predetermined maximum number of iterations has been reached, otherwise return to Step 2.

An implementation of this recursive procedure for the sampling delay is described below with reference to FIG. 5.

Simple Procedure

A simple variant of the above recursive procedure is to stop after Step 1, without proceeding to Steps 2 to 4. In this case, the sampling delay estimation is given by:

$$\left|\begin{matrix}\hat{\phi}_{1,n}\\ \hat{\phi}_{2,n}\end{matrix}\right| = \left|\begin{matrix}C_1\\ C_2\end{matrix}\right| Y_n, \quad \hat{\tau}_n = \frac{1}{\pi}\left(a \tan\left(\frac{\text{real}(\hat{\phi}_{2,n}\hat{\phi}_{1,n}')}{|\hat{\phi}_{1,n}|^2}\right)\right) \quad (34)$$

where $C_i$ is the i-th element of the known matrix C.

An implementation of this simple procedure for the sampling delay is described below with reference to FIG. 4.

Frame Synchronization

The timing recovery methods described above apply when the sampling delay $\tau$ is in the interval from $-T/2$ to $T/2$. Frame synchronization serves to meet this requirement where the absolute or total sampling delay $\tau_s$ is outside of the interval from $-T/2$ to $T/2$ but is within a number L of symbol spacings T. Thus $\tau_s = \tau + iT$, where $\tau$ is in the interval from $-T/2$ to $T/2$ and i is an index in the range from $-(L-1)/2$ to $(L-1)/2$ where L is odd. Frame synchronization serves to check all of the intervals from $-T/2+iT$ to $T/2+iT$ and to make a maximum likelihood choice from these intervals, i.e. to make a maximum likelihood selection of the index i.

Frame synchronization is based on an observation interval corresponding to the uncertainty of L symbol spacings of the sampling delay t, so that it is applied to a set of observation vectors Y each of which has the form of equation (2), the set being:

$$Y_{n-(L-1)}^{n+(L-1)} = \{Y_{n-(L-1)}, Y_{n-(L-1)+2}, \ldots Y_n, \ldots Y_{n+(L-1)}\} \quad (35)$$

Applying maximum likelihood principles, the task of frame synchronization and timing recovery jointly is to determine the maximum of the likelihood function:

$$P(Y_{n-(L-1)}^{n+(L-1)}|\tau, i) \quad (36)$$

which can be divided into the task of frame synchronization of determining the maximum of the average likelihood function:

$$P(Y_{n-(L-1)}^{n+(L-1)}|i) = \frac{1}{T}\int_{-T/2}^{T/2} P(Y_{n-(L-1)}^{n+(L-1)} | \tau, i) d\tau \quad (37)$$

and the task of timing recovery of determining the maximum of the likelihood function:

$$P(Y_{n-(L-1)}^{n+(L-1)}|\tau, \tilde{i}) \quad (38)$$

where $\tilde{i} = \max^{-1}(P(Y_{n-(L-1)}^{n+(L-1)}|i))$.

Instead of directly computing the likelihood function in equation (37), an indirect approach can be used as follows. For each value of the index i in the range from $-(L-1)/2$ to $(L-1)/2$, equations (7), (16), (18), and (20) can be expressed as:

$$Y_{n+2i} = G(\tau)SU + H_{n+2i} \quad Y_{n+2i} = B\Phi + H_{n+2i}$$

$$\hat{\Phi}_{n+2i} = CY_{n+2i} \qquad \hat{\Phi}_{n+2i} = F(\tau)U + \Gamma_{n+2i}$$

from which the following likelihood function can be derived:

$$P(\hat{\Phi}_{n+2i} \mid i) = \frac{1}{T}\int_{-T/2}^{T/2}\int_{U} P(\hat{\Phi}_{n+2i} \mid \tau, U, i) d\tau \cdot dU \quad (39)$$

with $p(\hat{\Phi}_{n+2i} \mid U_n, \tau, i) =$ (40)

$$\frac{\exp\left(-\left((\hat{\Phi}_{n+2i} - F(\tau)U)' V_\gamma^{-1}(\hat{\Phi}_{n+2i} - F(\tau)U)\right)/2\right)}{(2\pi)^{3/2} det(V_\gamma)^{1/2}}$$

Instead of averaging over the variable $\tau$, equation (39) is simplified by using the estimated sampling delay $\hat{\tau}_{n+2i}$ obtained using any of the timing recovery methods described above. By averaging over the variable $U_n$, the following then results:

$$p(\hat{\Phi}_{n+2i} \mid i) \cong \frac{\exp\left((\hat{\Phi}'_{n+2i} V_\gamma^{-1} F(\tau_{n+2i}) V_u F(\tau_{n+2i})' V_\gamma^{-1} \hat{\Phi}_{n+2i})/2\right)}{det(V_u^{-1})D(\hat{\Phi}_{n+2i})} \quad (41)$$

where $V_u = (F(\tau_{n+2i})' V_\gamma^{-1} F(\tau_{n+2i}))^{-1}$ and $D(\hat{\Phi}_{n+2i}) = \exp\left(\frac{1}{2}\hat{\Phi}'_{n+2i} V_\gamma^{-1} \hat{\Phi}_{n+2i}\right)$.

Applying the recursive procedure described above for deriving the estimate $\hat{U}_n$, the likelihood function in equation (41) can be written as:

$$p(\hat{\Phi}_{n+2i} \mid i) \cong \frac{\exp\left(\frac{|\hat{U}_{n+2i}|^2}{2V_u}\right)}{det(V_u^{-1})D(\hat{\Phi}_{n+2i})} \quad (42)$$

where $$\hat{U}_{n+2i} = (F(\tau_{n+2i})' V_\gamma^{-1} F(\tau_{n+2i}))^{-1} F(\tau_{n+2i})' V_\gamma^{-1} \hat{\Phi}_{n+2i}.$$

Ignoring dependence of $V_u$ on $\hat{\tau}_{n+2i}$, the following results:

$$\hat{i} = \max^{-1}(p(\hat{\Phi}_{n+2i}|i)) \approx \max^{-1}(|\hat{U}_{n+2i}|^2) \quad (43)$$

Thus the frame synchronization task is reduced to estimation of a signal amplitude for each value of the index i, and a selection of that value of the index i corresponding to the maximum signal amplitude.

Combined Frame Synchronization and Timing Recovery

Combining this frame synchronization method with the recursive procedure for timing recovery previously described results in the following recursive procedure, which assumes use of the function pair (9) as above, for combined frame synchronization and timing recovery:

Step 1: For each value of the index i in the range from $-(L-1)/2$ to $(L-1)/2$, perform the following steps 1A to 1C:

1A: Estimate the indirect variable vector in accordance with equation (44):

$$\hat{\Phi}_{n+2i} \equiv \begin{vmatrix} \hat{\phi}_{1,(n+2i)} \\ \hat{\phi}_{2,(n+2i)} \\ \hat{\phi}_{3,(n+2i)} \end{vmatrix} = CY_{n+2i} \quad (44)$$

1B: Initially (for a counter k=1) estimate the signal amplitude and sampling delay in accordance with equations (45) and (46):

$$\hat{U}_{n+2i}^{k=1} = \hat{\phi}_{3,(n+2i)} \quad (45)$$

$$\hat{\tau}_{n+2i}^{k=1} = \frac{1}{\pi}\left(a\tan\left(\text{real}\frac{\hat{\phi}_{2,(n+2i)}}{\hat{\phi}_{1,(n+2i)}}\right)\right) \quad (46)$$

1C: Iteratively (for k=2 to a maximum number K of iterations) estimate the signal amplitude and sampling delay in accordance with equations (47) and (48):

$$\hat{U}_{n+2i}^k = \frac{F(\hat{\tau}_{n+2i}^{k-1})' V_\gamma^{-1} \hat{\Phi}_{n+2i}}{(F(\hat{\tau}_{n+2i}^{k-1})' V_\gamma^{-1} F(\hat{\tau}_{n+2i}^{k-1}))} \quad (47)$$

$$\hat{\tau}_{n+2i}^k = \frac{1}{\pi} a\tan\left(\text{real}\frac{\hat{\phi}_{2,(n+2i)}}{\left(\hat{\phi}_{1,(n+2i)} - c_\gamma(\hat{\phi}_{3,(n+2i)} - \hat{U}_{n+2i}^{k-1})\right)}\right) \quad (48)$$

Step 2: For each value of the index i in the range from $-(L-1)/2$ to $(L-1)/2$, determine the index i of the maximum estimated signal amplitude determined in Step 1, and determine the total sampling delay from this index and the estimated sampling delay determined in Step 1, in accordance with equations (49) and (50):

$$\hat{i} = \max^{-1}(|\hat{U}_{n+2i}^K|^2) \quad (49)$$

$$\hat{\tau}_s = \hat{\tau}_{n+2i}^K + \hat{i}T \quad (50)$$

The complexity of this procedure depends on the number of iterations K and on the number L. The procedure is greatly simplified, with a slight reduction in accuracy, in a similar manner to that for the timing recovery procedure alone by eliminating the recursion step 1C, so that Step 1 only comprises the steps 1A and 1B. The equations (44) to (46), (49), and (50) apply as above with K=1, and with the function pair (9) equation (45) becomes:

$$\hat{U}_{n+2i} = \hat{\phi}_{1,(n+2i)} \cos(\pi\hat{\tau}_{n+2i}) + \hat{\phi}_{2,(n+2i)} \sin(\pi\hat{\tau}_{n+2i}) \quad (51)$$

An implementation of this combined and simplified frame synchronization and timing recovery procedure is described below with reference to FIG. 6.

Physical Implementation

Referring now to the drawings, FIG. 1 illustrates in a block diagram parts of a wireless digital communications receiver, in which a wireless digital communications signal is supplied via an RF (radio frequency) circuit 20 of a receiver to a down converter 22 to produce a signal which is sampled by a sampler 24, the samples being converted into digital form by an A-D (analog-to-digital) converter 26. The digitized samples are interpolated by an interpolator 28 in accordance with a recovered estimated sampling delay $\hat{\tau}_n$ to produce samples $Y_n$, at estimated optimal sampling times, for further processing. As an alternative to the provision of the interpolator 28, the estimated sampling delay $\hat{\tau}_n$ could be used directly to control the sampling time of the sampler 24. The interpolator 28 forms part of digital circuits 30, conveniently implemented in a DSP (digital signal processor) integrated circuit, which also include a timing or clock recovery and frame synchronization block 32 which produces the estimated sampling delay $\hat{\tau}_n$ as described below, and a carrier recovery block 34 which is not described further here. The samples $Y_n$ from the interpolator 28 are supplied as the input signal to the blocks 32 and 34.

The block 32 desirably combines the functions of frame synchronization and timing recovery using the procedures described above and in a manner which is further described below with reference to FIG. 6. However, it is also possible for the timing recovery procedure to be implemented separately from the frame synchronization procedures, and to this end initially only the timing recovery functions are described below with reference to FIGS. 2 to 5, it being assumed in these cases that the sampling delay $\tau_n$ is within the interval from $-T/2$ to $T/2$.

Timing Recovery

Figure 2:
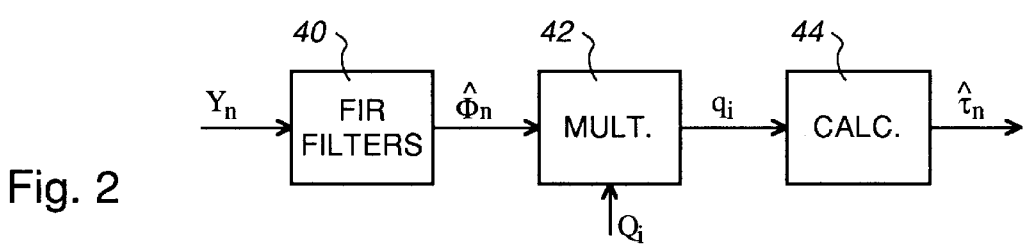
FIG. 2 illustrates a block diagram of a timing recovery arrangement in accordance with this invention.

FIG. 2 illustrates a block diagram of an implementation of the timing recovery parts of the block 32 for producing the estimated sampling delay $\hat{\tau}_n$ from the received signal samples $Y_n$ in accordance with the optimal estimation procedure described above. This implementation comprises a FIR (finite impulse response) filter unit 40, a multiplier unit 42, and a calculation unit 44. The FIR filter unit 40 is supplied with the signal samples $Y_n$ and filters these to produce the estimate $\hat{\Phi}_n$ in accordance with equation (18) above. The multiplier unit 42 produces the product $\hat{\Phi}'_n Q_i \hat{\Phi}_n$ in accordance with equation (24) above from the estimate $\hat{\Phi}_n$ and matrices $Q_i$, for values of i from 1 to 5, obtained as described above from look-up tables, the output of the multiplier unit 42 comprising constant scalars $q_i$. These are supplied to the calculation unit 44 which produces the estimated sampling delay $\hat{\tau}_n$ in accordance with equation (25).

Figure 3:
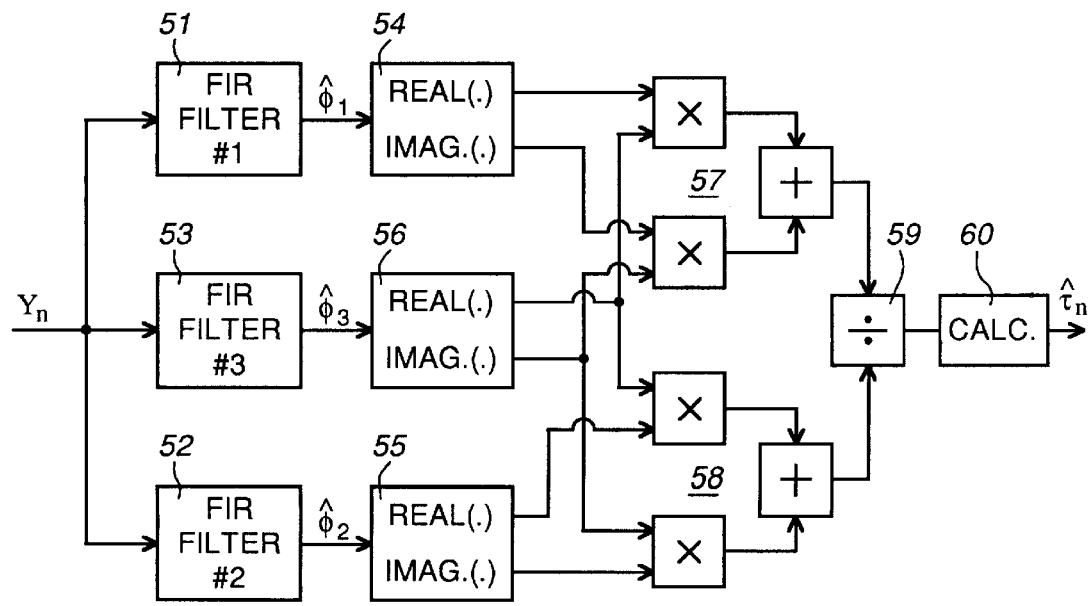
FIGS. 3, 4, and 5 schematically illustrate in greater detail timing recovery arrangements in accordance with embodiments of the invention.

FIG. 3 illustrates a block circuit diagram of an implementation of the timing recovery parts of the block 32 for producing the estimated sampling delay $\hat{\tau}_n$ from the received signal samples $Y_n$ in accordance with the one-step non-linear transformation procedure described above. In this implementation, the signal samples $Y_n$ are supplied to three FIR filters 51, 52, and 53 for producing the indirect variable estimates $\hat{\phi}_1$, $\hat{\phi}_2$, and $\hat{\phi}_3$ respectively in accordance with equation (18). The real and imaginary parts of these estimates are separated by units 54, 55, and 56 respectively and are used by the remainder of the circuit of FIG. 3 to implement the function of equation (27). This part of the circuit comprises two complex multipliers 57 and 58, each comprising two multipliers for multiplying real and imaginary components and an adder for summing the products of these multipliers, arranged to produce respectively the denominator and the numerator in equation (27), a divider 59 arranged to perform the division of the numerator by the denominator, and a calculation unit 60 arranged to perform the function $(1/\pi)\text{atan}0$ of equation (27) and hence to produce the estimated sampling delay $\hat{\tau}_n$.

Figure 4:
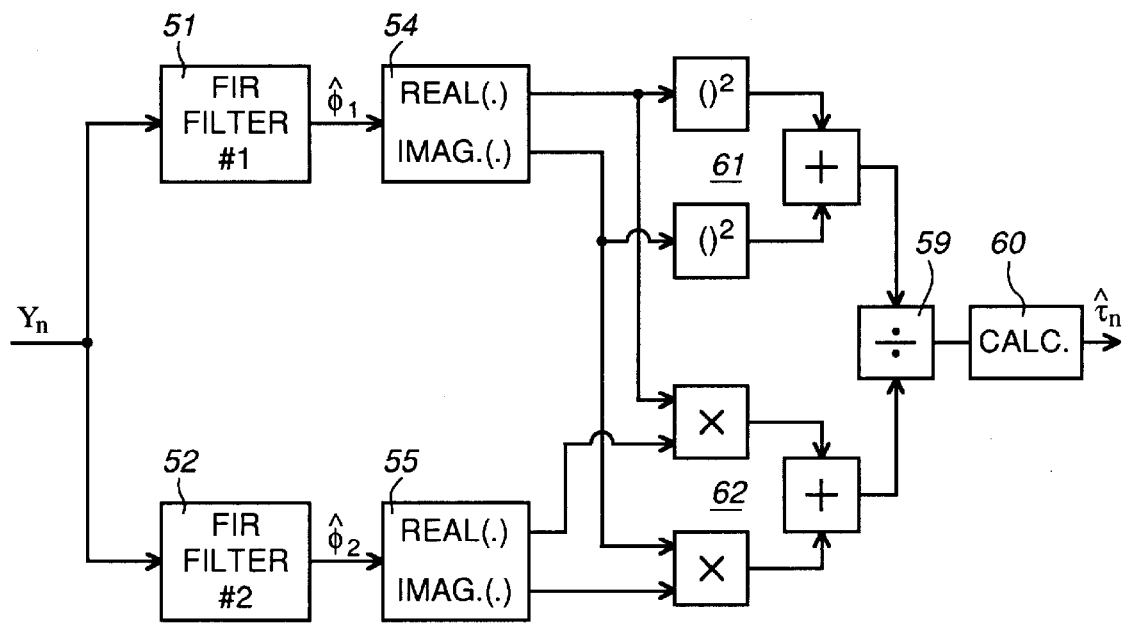

FIG. 4 illustrates a block circuit diagram of an implementation of the timing recovery parts of the block 32 for producing the estimated sampling delay $\hat{\tau}_n$ from the received signal samples $Y_n$ in accordance with the simple procedure described above. The same references are used as in FIG. 3 to denote similar parts. In FIG. 4, the signal samples $Y_n$ are supplied to two FIR filters 51 and 52 for producing the indirect variable estimates $\hat{\phi}_1$ and $\hat{\phi}_2$ respectively in accordance with equation (18). The real and imaginary parts of these estimates are separated by units 54 and 55 respectively and are used by the remainder of the circuit of FIG. 4 to implement the function of equation (34). This part of the circuit comprises a complex squarer 61 (comprising two squarers and an adder) and a complex multiplier 62 (comprising two multipliers and an adder), arranged to produce respectively the denominator and the numerator in equation (34), a divider 59 arranged to perform the division of the numerator by the denominator, and a calculation unit 60 arranged to perform the function $(1/\pi)\text{atan}0$ of equation (34) and hence to produce the estimated sampling delay $\hat{\tau}_n$.

Figure 5:
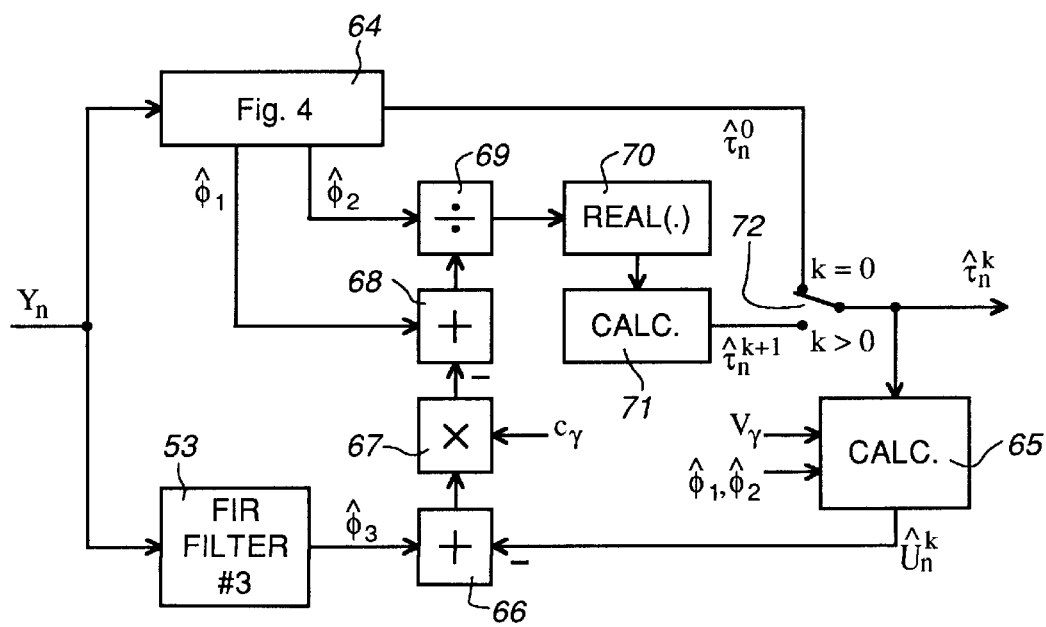

FIG. 5 illustrates a block circuit diagram of an implementation of the timing recovery parts of the block 32 for producing the estimated sampling delay $\hat{\tau}_n$ from the received signal samples $Y_n$ in accordance with the recursive procedure described above. It incorporates the circuit of FIG. 4, shown as a unit 64, for producing the indirect variable estimates $\hat{\phi}_1$ and $\hat{\phi}_2$ and the estimated sampling delay $\hat{\tau}_n^0$ (i.e. the initial estimated sampling delay in Step 1 of the recursive procedure, for which k=0), and the FIR filter 53 of FIG. 3 arranged to produce the indirect variable estimate $\hat{\phi}_3$. The circuit also comprises units 65 to 71 and a switch 72 whose functions are described below.

Step 1 of the recursive procedure is carried out by the unit 64 as described above to provide the initial estimated sampling delay for k=0, thereby implementing equation (31) (or (34)), the switch 72 being in the position shown to supply this estimate to the output and to the calculation unit 65. The calculation unit 65 is also supplied with the indirect variable estimates $\hat{\phi}_1$ and $\hat{\phi}_2$ and the matrix $V_y$, and calculates the estimate $\hat{U}_n^k$ (Step 2 of the recursive procedure) in accordance with equation (32). The units 66 to 71 implement equation (33), corresponding to Step 3 of the recursive procedure, to produce the estimated sampling delay for the next-higher value of k, for which k>0 so that as indicated in FIG. 5 the switch 72 is moved to its other position to provide the new estimated sampling delay to the output and to the calculation unit 65.

As can be appreciated from FIG. 5 and equation (33), the unit 66 is an adder, with a subtraction input, which performs the subtraction in brackets in the denominator of equation (33), the difference is multiplied by $c_y$ in the multiplier unit 67 and the product is subtracted from $\hat{\phi}_1$ in the adder unit 68 to produce the denominator in equation (33). The unit 69 is a divider which performs the division in equation (33), the unit 70 provides the real part of the division result, and the unit 71 is a calculation unit which performs the function $(1/\pi)\text{atan}0$. It can be appreciated that the calculation units 71 and 60 (in the unit 64) can be constituted by a single unit by interchanging the positions of these units and the switch 72.

Timing Recovery Simulation Results

Computer simulation results of the different procedures described above are indicated in the table below by way of example for an SNR of 8 dB. The choice of sync word, from the six sync words specified in IS-54, was found to have no significant effect on these results. The simulation used the function pair of equation (9) in the approximation of equation (8). The coefficients of the constant approximating matrices $A_i$ (i=1 to 3) of equation (8) and of the constant expansion matrices $Q_i$ (i=1 to 5) of equation (24) were computed separately. For each of the procedures described above, the table indicates the standard deviation of the estimated sampling delay ($\sigma/T$), the probability of sampling error outside of the intervals from $-0.15T$ to $0.15T$, $-0.2T$ to $0.2T$, and $-0.25T$ to $0.25T$, denoted P.15, P.2, and P.25 respectively, and the number of floating point operations, denoted Nflops, for each simulation. With other SNRs, the latter number is largely unchanged.

| Delay Equation: | Optimal Estimation FIG. 2 (25) | Non-linear Transformation FIG. 3 (27) | Simple Procedure FIG. 4 (34) | Recursive Procedure FIG. 5 (33) |
|---|---|---|---|---|
| σ/T | 0.0426 | 0.0477 | 0.051 | 0.0462 |
| P.15 | 0.0008 | 0.0019 | 0.0035 | 0.0012 |
| P.2 | 0 | 0.0001 | 0.0003 | 0 |
| P.25 | 0 | 0 | 0 | 0 |
| Nflops | 1461 | 710 | 480 | 893 |

As can be seen from the table, the optimal estimation provides the best results, at the expense of computational complexity (high Nflops). The sub-optimal procedures involve considerably less computational complexity, with the recursive procedure of equations (31) to (33) illustrated by FIG. 5 providing a presently preferred compromise between accuracy and computational complexity.

Combined Frame Synchronization and Timing Recovery

FIG. 6 illustrates a block circuit diagram of an implementation of combined frame synchronization and timing recovery functions of the block 32 for producing the estimated sampling delay $\hat{\tau}_s$ from the received signal samples $Y_{n+2i}$ in accordance with the first step of the recursive procedure described above. It incorporates the circuit of FIG. 4, again shown as a unit 64, which produces the real (Re) and imaginary (Im) components of the indirect variable estimates $\hat{\phi}_{1,(n+2i)}$ and $\hat{\phi}_{2,(n+2i)}$ as well as the estimated sampling delay $\hat{\tau}_{n+2i}$ on a line 72 as described above and in accordance with equation (46).

The circuit of FIG. 6 also comprises units 73 to 83 which serve to produce on a line 84 squared estimated signal amplitudes $|\hat{U}_{n+2i}|^2$ in accordance with equation (51). The units 73 and 74 comprise cos and sin operators (e.g. look-up tables in memory) which are supplied with the estimated sampling delay $\hat{\tau}_{n+2i}$ from the line 72 and produce at their outputs the values $\cos(\pi\hat{\tau}_{n+2i})$ and $\sin(\pi\hat{\tau}_{n+2i})$ respectively, used in equation (51). The units 75 to 78 are multipliers which multiply the real and imaginary components of the indirect variable estimates $\hat{\phi}_{1,(n+2i)}$ and $\hat{\phi}_{2,(n+2i)}$ from the unit 64 by the outputs of the units 73 and 74 to implement the products in equation (51). The units 79 and 80 are adders arranged to add together respectively the real and imaginary components of these products, the units 81 and 82 are squarers arranged to square the outputs of the adders 79 and 80 respectively, and the unit 83 is an adder arranged to add together the outputs of the squarers 81 and 82 thereby to produce the squared estimated signal amplitudes $|\hat{U}_{n+2i}|^2$ on the line 84.

In the remaining parts of the circuit of FIG. 6, the estimates $\hat{\tau}_{n+2i}$ on the line 72 are sampled by a sampling switch 85 at the sampling times iT and the samples are supplied to an L-stage shift register 86, and similarly the estimates $|\hat{U}_{n+2i}|^2$ on the line 84 are sampled by a sampling switch 87 at the sampling times iT and the samples are supplied to an L-stage shift register 88. For example, L=5. A unit 89 is arranged to determine, at each sampling time and in accordance with equation (49), the index $\hat{i}$ of the maximum squared amplitude in the L stages of the shift register 88, and supplies this index as an output to a multiplier 90 and to a selection control input of a selector 91. The selector 91 is supplied with the estimates $\hat{\tau}_{n+2i}$ stored in the L stages of the shift register 86 and is arranged to supply to a line 92 that one of these estimates which corresponds to the index $\hat{i}$ at its selection control input. The multiplier 90 multiplies the index $\hat{i}$ by the symbol spacing T, and an adder 93 is arranged to add the product $\hat{i}T$ to the output of the selector 91, to produce the total estimated sampling delay $\hat{\tau}_s$ in accordance with equation (50).

Although the above description relates only to the simple procedure for frame synchronization, it can be appreciated that this can be extended to the recursive procedure in a similar manner to that described above in relation to FIG. 5 for the timing recovery alone. It can also be appreciated that either of the procedures for frame synchronization can be combined with any of the procedures for timing recovery described above.

Combined Frame Synchronization and Timing Recovery Simulation Results

Computer simulations similar to those described above for the timing recovery alone are illustrated in the table below by way of example for an SNR of 8 dB. The table compares the results for the combined frame synchronization and timing recovery procedure as described above, using the function pair (9) in the approximation of equation (8), with results for a conventional matched filter arrangement known in the art, indicating for zero and 300 Hz carrier frequency shifts f the standard deviation of the estimated sampling delay (σ/T) and the sampling error probabilities P.15, P.2, and P.25. The choice of sync word was again found to have no significant effect on the results. For greater SNRs, the improvements of this combined frame synchronization and timing recovery procedure over the conventional matched filter arrangement are even greater.

| Carrier shift f: | Combined Procedure 0 | Matched Filter Arrangement 0 | Combined Procedure 300 | Matched Filter Arrangement 300 |
|---|---|---|---|---|
| σ/T | 0.053307 | 0.151435 | 0.056300 | 0.150954 |
| P.15 | 0.0066 | 0.4016 | 0.0074 | 0.4008 |
| P.2 | 0.0004 | 0.2142 | 0.0010 | 0.2138 |
| P.25 | 0.0002 | 0.0694 | 0 | 0.0654 |

Although the invention has been described above primarily in relation to the function pair of equation (9), it should be appreciated that any of the other function pairs in equations (10) to (13), or other function pairs for use in the approximation of equation (8), may be used. In addition, although particular embodiments of the invention have been described in detail, it should be appreciated that numerous other modifications, variations, and adaptations may be made without departing from the scope of the invention as defined in the claims.

What is claimed is:

1. A method of determining sampling delay in samples of a received communications signal, comprising the steps of:
   estimating, using a maximum likelihood criterion, indirect variables of a linear complex vector which approximates the received signal samples, the indirect variables embodying sampling delay information; and
   determining a sampling delay from the estimated indirect variables for timing recovery of the received communications signal.

2. A method as claimed in claim 1 wherein each component of the linear complex vector comprises a linear combination of a predetermined pair of functions dependent upon the sampling delay.

3. A method as claimed in claim 2 wherein the pair of functions comprises functions $\cos(\pi\tau)$ and $\sin(\pi\tau)$ where $\tau$ represents the sampling delay.

4. A method as claimed in claim 1 wherein the step of estimating each indirect variable comprises filtering the received signal samples using a finite impulse response filter characteristic.

5. A method as claimed in claim 1 wherein the step of determining the sampling delay from the estimated indirect variables comprises multiplying the estimated indirect variables by real elements of predetermined stored matrices.

6. A method as claimed in claim 1 wherein the step of determining the sampling delay from the estimated indirect variables comprises performing a single non-linear transformation of the estimated indirect variables.

7. A method as claimed in claim 1 wherein the step of determining the sampling delay from the estimated indirect variables comprises calculating the sampling delay in accordance with a predetermined function of the real part of a product of the complex conjugate of a first estimated indirect variable with a second estimated indirect variable, divided by the square of the amplitude of the first estimated indirect variable.

8. A method as claimed in claim 7 wherein the predetermined function comprises the function $(1/\pi)\mathrm{atan}()$.

9. A method as claimed in claim 1 wherein the step of determining the sampling delay from the estimated indirect variables comprises the steps of initially calculating an estimate of the sampling delay in accordance with a predetermined function of the estimated indirect variables, and iteratively one or more times:
estimating a complex fading factor of the received signal samples in dependence upon the estimate of the sampling delay and the estimated indirect variables; and
re-estimating the sampling delay in dependence upon the estimated complex fading factor and the estimated indirect variables.

10. A method as claimed in claim 1 and further comprising the steps of:
adding to the determined sampling delay for timing recovery of the received communications signal a sampling delay comprising an integer number i of sampling spacings T for frame synchronization of the received communications signal; and
determining the number i by the steps of:
determining, in dependence upon the estimated indirect variables and the determined sampling delay for timing recovery, signal amplitudes of a plurality of received signal samples; and
selecting the number i corresponding to a maximum amplitude sample.

11. A method as claimed in claim 10 wherein the step of determining signal amplitudes comprises iteratively determining the signal amplitudes in dependence upon iterative determinations of the sampling delay for timing recovery.

12. A method of frame synchronization and timing recovery by determining sampling delay in samples of a received communications signal, comprising the steps of:
estimating, using a maximum likelihood criterion, indirect variables of a linear complex vector which approximates the received signal samples, the indirect variables embodying sampling delay information; and
for each of a plurality of received signal samples:
determining a first sampling delay from the estimated indirect variables, the first sampling delay being less than an sample spacing;
determining, in dependence upon the estimated indirect variables and the respective first sampling delay, the signal amplitude of each of a plurality of received signal samples;
identifying an index of a maximum of the determined signal amplitudes relative to a current sample; and
adding the first sampling delay for the sample identified by the index to a product of the sampling spacing multiplied by the index to produce a combined sampling delay for frame synchronization and timing recovery.

13. A method as claimed in claim 12 wherein steps of determining the first sampling delay and the signal amplitudes are performed iteratively.

14. Apparatus for determining a sampling delay for sampling a received communications signal, comprising:
a plurality of finite impulse response filters responsive to received signal samples for producing a plurality of indirect variables of a linear complex vector which approximates the received signal samples according to a maximum likelihood criterion; and
a calculation unit responsive to the plurality of indirect variables for calculating an estimated sampling delay.

15. Apparatus as claimed in claim 14 wherein the calculation unit comprises a multiplier for multiplying the plurality of indirect variables by real elements of predetermined matrices from a store.

16. Apparatus as claimed in claim 14 wherein the calculation unit comprises functions for calculating the estimated sampling delay as a function of $\mathrm{real}(\hat{\phi}_2, \hat{\phi}'_3)/\mathrm{real}(\hat{\phi}_1, \hat{\phi}'_3)$, where $\hat{\phi}_1$, $\hat{\phi}_2$, and $\hat{\phi}_3$ are the plurality of indirect variables and $\hat{\phi}'_3$ is the complex conjugate of $\hat{\phi}_3$.

17. Apparatus as claimed in claim 14 wherein the calculation unit comprises functions for calculating the estimated sampling delay as a function of $\mathrm{atan}(\mathrm{real}(\hat{\phi}_2, \hat{\phi}'_1)/|\hat{\phi}_1|^2)$, where $\hat{\phi}_1$ and $\hat{\phi}_2$ are the plurality of indirect variables and $\hat{\phi}'_1$ is the complex conjugate of $\hat{\phi}_1$.

18. Apparatus as claimed in claim 14 wherein the calculation unit further comprises functions for calculating an estimated complex fading factor of the received signal samples in dependence upon the plurality of indirect variables and the estimated sampling delay and for recursively calculating the estimated sampling delay in dependence upon the plurality of indirect variables and the estimated complex fading factor.

19. Apparatus as claimed in claim 14 wherein the plurality of finite impulse response filters and the calculating unit are constituted by functions of at least one digital signal processor.

20. A method of determining sampling delay in complex signal samples of a received communications signal, comprising the steps of:
estimating, using a maximum likelihood criterion, indirect variables of a linear complex vector which approximates the received signal samples, each component of the linear complex vector comprising a linear combination of a predetermined pair of functions dependent upon a sampling delay; and
determining the sampling delay from the estimated indirect variables for timing recovery of the received communications signal, the determining step comprising multiplying the estimated indirect variables by real elements of predetermined stored matrices.

21. A method as claimed in claim 20 wherein the step of estimating each indirect variable comprises filtering the received complex signal samples using a finite impulse response filter characteristic.

22. A method of determining sampling delay in complex signal samples of a received communications signal, comprising the steps of:
estimating, using a maximum likelihood criterion, indirect variables of a linear complex vector which approximates the received signal samples, each component of the linear complex vector comprising a linear combination of a predetermined pair of functions dependent upon a sampling delay; and determining the sampling delay from the estimated indirect variables for timing recovery of the received communications signal, the determining step comprising performing a single non-linear transformation of the estimated indirect variables.

23. A method as claimed in claim 22 wherein the step of estimating each indirect variable comprises filtering the received complex signal samples using a finite impulse response filter characteristic.

24. A method of determining sampling delay in complex signal samples of a received communications signal, comprising the steps of:

estimating, using a maximum likelihood criterion, indirect variables of a linear complex vector which approximates the received signal samples, each component of the linear complex vector comprising a linear combination of a predetermined pair of functions dependent upon a sampling delay; and determining the sampling delay from the estimated indirect variables for timing recovery of the received communications signal, the determining step comprising calculating the sampling delay in accordance with a predetermined function of the real part of a product of the complex conjugate of a first estimated indirect variable with a second estimated indirect variable, divided by the square of the amplitude of the first estimated indirect variable.

25. A method as claimed in claim 24 wherein the step of estimating each indirect variable comprises filtering the received complex signal samples using a finite impulse response filter characteristic.

26. A method of determining sampling delay in complex signal samples of a received communications signal, comprising the steps of:

estimating, using a maximum likelihood criterion, indirect variables of a linear complex vector which approximates the received signal samples, each component of the linear complex vector comprising a linear combination of a predetermined pair of functions dependent upon a sampling delay; and determining the sampling delay from the estimated indirect variables for timing recovery of the received communications signal, the determining step comprising the steps of initially calculating an estimate of the sampling delay in accordance with a predetermined function of the estimated indirect variables, and iteratively one or more times;

estimating a complex fading factor of the received signal samples in dependence upon the estimate of the sampling delay and the estimated indirect variables; and re-estimating the sampling delay in dependence upon the estimated complex fading factor and the estimated indirect variables.

27. A method as claimed in claim 26 wherein the step of estimating each indirect variable comprises filtering the received complex signal samples using a finite impulse response filter characteristic.

* * * * *